(12) United States Patent
Crane et al.

(10) Patent No.: US 8,284,492 B2
(45) Date of Patent: Oct. 9, 2012

(54) MICRO-OPTIC FILM STRUCTURE THAT ALONE OR TOGETHER WITH A SECURITY DOCUMENT OR LABEL PROJECTS IMAGES SPATIALLY COORDINATED WITH STATIC IMAGES AND/OR OTHER PROJECTED IMAGES

(75) Inventors: Timothy T. Crane, Windsor, MA (US); Karin Mörck-Hamilton, Stockholm (SE); Marco Maraschi, Stockholm (SE); Tod L. Niedeck, Amherst, NH (US)

(73) Assignee: Crane & Co., Inc., Dalton, MA (US)

( * ) Notice: Subject to any disclaimer, the term of this patent is extended or adjusted under 35 U.S.C. 154(b) by 668 days.

(21) Appl. No.: 11/747,687

(22) Filed: May 11, 2007

(65) Prior Publication Data

US 2007/0273143 A1 Nov. 29, 2007

Related U.S. Application Data

(60) Provisional application No. 60/800,257, filed on May 12, 2006.

(51) Int. Cl.
G02B 27/10 (2006.01)
(52) U.S. Cl. ........................................ 359/620; 359/626
(58) Field of Classification Search ........... 359/619–626
See application file for complete search history.

(56) References Cited

U.S. PATENT DOCUMENTS

| | | | |
|---|---|---|---|
| 992,151 A | 5/1911 | Berthon | |
| 1,824,353 A | 9/1931 | Jensen | |
| 1,849,036 A | 3/1932 | Ernst | |
| 1,942,841 A | 1/1934 | Shimizu | |
| 2,268,351 A | 12/1941 | Tanaka | |
| 2,432,896 A | 12/1947 | Hotchner | |
| 2,888,855 A | 6/1959 | Tanaka | |
| 2,992,103 A | 7/1961 | Land et al. | |

(Continued)

FOREIGN PATENT DOCUMENTS

DE 19804858 8/1999

(Continued)

OTHER PUBLICATIONS

Hutley, M.C., et al., "The Moiré Magnifier", Pure Appl. Opt. 3, 1994, pp. 133-142, IOP Publishing Ltd., UK.

(Continued)

*Primary Examiner* — Alicia M Harrington
(74) *Attorney, Agent, or Firm* — Holland & Bonzagni, P.C.; Mary R. Bonzagni, Esq.

(57) ABSTRACT

A micro-optic film structure that alone or together with a security document or label projects images spatially coordinated with static images and/or other projected images is provided. The inventive film structure is made up of: (a) one or more polymer film materials; (b) one or more planar arrangements of primary image icons; (c) one or more planar arrangements of focusing elements or lenses; and (d) one or more secondary image icons. The planar arrangements are configured such that when a planar arrangement of primary image icons is viewed through a planar arrangement of focusing elements or lenses, one or more first synthetic images are projected. The secondary image icons appear as static and/or other projected images. These images are spatially coordinated with the first synthetic image(s) projected by the film structure, such that when simultaneously displayed therewith, they visually enhance or cancel the projected first synthetic image(s).

35 Claims, 5 Drawing Sheets

U.S. PATENT DOCUMENTS

| | | | |
|---|---|---|---|
| 3,122,853 A | 3/1964 | Koonz | |
| 3,241,429 A | 3/1966 | Rice et al. | |
| 3,264,164 A | 8/1966 | Jerothe | |
| 3,312,006 A | 4/1967 | Rowland | |
| 3,357,772 A | 12/1967 | Rowland | |
| 3,463,581 A | 8/1969 | Clay | |
| 3,609,035 A | 9/1971 | Ataka | |
| 3,643,361 A | 2/1972 | Eaves | |
| 3,704,068 A | 11/1972 | Waly | |
| 3,811,213 A | 5/1974 | Eaves | |
| 4,073,650 A | 2/1978 | Yevick | |
| 4,185,191 A | 1/1980 | Stauffer | |
| 4,417,784 A | 11/1983 | Knop et al. | |
| 4,498,736 A | 2/1985 | Griffin | |
| 4,507,349 A | 3/1985 | Fromson et al. | |
| 4,634,220 A | 1/1987 | Hockert et al. | |
| 4,645,301 A | 2/1987 | Orensteen et al. | |
| 4,688,894 A | 8/1987 | Hockert | |
| 4,691,993 A | 9/1987 | Porter et al. | |
| 4,756,972 A | 7/1988 | Kloosterboer et al. | |
| 4,765,656 A | 8/1988 | Becker et al. | |
| 4,892,336 A | 1/1990 | Kaule et al. | |
| 4,892,385 A | 1/1990 | Webster, Jr. et al. | |
| 4,920,039 A | 4/1990 | Fotland et al. | |
| 5,074,649 A | 12/1991 | Hamanaka | |
| 5,085,514 A | 2/1992 | Mallik et al. | |
| 5,232,764 A | 8/1993 | Oshima | |
| 5,254,390 A | 10/1993 | Lu | |
| 2,355,902 A | 8/1994 | Berg | |
| 5,359,454 A | 10/1994 | Steenblik et al. | |
| 5,384,861 A | 1/1995 | Mattson et al. | |
| 5,461,495 A | 10/1995 | Steenblik et al. | |
| 5,464,690 A | 11/1995 | Boswell | |
| 5,468,540 A | 11/1995 | Lu | |
| 5,479,507 A | 12/1995 | Anderson | |
| 5,492,370 A | 2/1996 | Chatwin et al. | |
| 5,555,476 A | 9/1996 | Suzuki et al. | |
| 5,568,313 A | 10/1996 | Steenblik et al. | |
| 5,575,507 A | 11/1996 | Yamauchi et al. | |
| 5,598,281 A | 1/1997 | Zimmerman et al. | |
| 5,623,347 A | 4/1997 | Pizzanelli | |
| 5,623,368 A | 4/1997 | Calderini et al. | |
| 5,643,678 A | 7/1997 | Boswell | |
| 5,670,003 A | 9/1997 | Boswell | |
| 5,674,580 A | 10/1997 | Boswell | |
| 5,688,587 A | 11/1997 | Burchard et al. | |
| 5,695,346 A | 12/1997 | Sekiguchi et al. | |
| 5,712,731 A | 1/1998 | Drinkwater et al. | |
| 5,723,200 A | 3/1998 | Oshima | |
| 5,737,126 A | 4/1998 | Lawandy | |
| 5,753,349 A | 5/1998 | Boswell | |
| 5,759,683 A | 6/1998 | Boswell | |
| 5,783,017 A | 7/1998 | Boswell | |
| 5,800,907 A | 9/1998 | Yumoto | |
| 5,810,957 A | 9/1998 | Boswell | |
| 5,812,313 A | 9/1998 | Johansen | |
| 5,886,798 A | 3/1999 | Staub et al. | |
| 5,933,276 A | 8/1999 | Magee | |
| 5,995,638 A | 11/1999 | Amidror | |
| 6,060,143 A | 5/2000 | Tompkin | |
| 6,089,614 A | 7/2000 | Howland et al. | |
| 6,176,582 B1 | 1/2001 | Grasnick | |
| 6,179,338 B1 | 1/2001 | Bergmann et al. | |
| 6,195,150 B1 | 2/2001 | Silverbrook | |
| 6,256,149 B1 | 7/2001 | Rolfe | |
| 6,288,842 B1 | 9/2001 | Florczak et al. | |
| 6,301,363 B1 | 10/2001 | Mowry, Jr. | |
| 6,328,342 B1 | 12/2001 | Belousov et al. | |
| 6,329,040 B1 | 12/2001 | Oshima et al. | |
| 6,345,104 B1 | 2/2002 | Rhoads | |
| 6,381,071 B1 | 4/2002 | Dona | |
| 6,414,794 B1 | 7/2002 | Rosenthal | |
| 6,424,467 B1 | 7/2002 | Goggins | |
| 6,450,540 B1 | 9/2002 | Kim | |
| 6,467,810 B2 | 10/2002 | Taylor et al. | |
| 6,500,526 B1 | 12/2002 | Hannington | |
| 6,587,276 B2 | 7/2003 | Daniell | |
| 6,616,803 B1 | 9/2003 | Isherwood et al. | |
| 6,641,270 B2 | 11/2003 | Hannington et al. | |
| 6,712,399 B1 | 3/2004 | Drinkwater et al. | |
| 6,721,101 B2 | 4/2004 | Daniell | |
| 6,724,536 B2 | 4/2004 | Magee | |
| 6,726,858 B2 | 4/2004 | Andrews | |
| 6,751,024 B1 | 6/2004 | Rosenthal | |
| 6,761,377 B2 | 7/2004 | Taylor et al. | |
| 6,795,250 B2 | 9/2004 | Johnson et al. | |
| 6,803,088 B2 | 10/2004 | Kaminsky et al. | |
| 6,819,775 B2 | 11/2004 | Amidror et al. | |
| 6,833,960 B1 | 12/2004 | Scarbrough et al. | |
| 6,856,462 B1 | 2/2005 | Scarbrough et al. | |
| 6,870,681 B1 | 3/2005 | Magee | |
| 6,900,944 B2 | 5/2005 | Tomczyk | |
| 6,935,756 B2 | 8/2005 | Sewall et al. | |
| 7,030,997 B2 | 4/2006 | Neureuther et al. | |
| 7,058,202 B2 | 6/2006 | Amidror | |
| 7,068,434 B2 * | 6/2006 | Florczak et al. | 359/626 |
| 7,114,750 B1 | 10/2006 | Alasia et al. | |
| 7,194,105 B2 | 3/2007 | Hersch et al. | |
| 7,246,824 B2 | 7/2007 | Hudson | |
| 7,254,265 B2 | 8/2007 | Naske et al. | |
| 7,288,320 B2 | 10/2007 | Steenblik et al. | |
| 7,372,631 B2 | 5/2008 | Ozawa | |
| 7,422,781 B2 | 9/2008 | Gosselin | |
| 7,457,038 B2 | 11/2008 | Dolgoff | |
| 7,504,147 B2 | 3/2009 | Hannington | |
| 7,545,567 B2 | 6/2009 | Tomczyk | |
| 7,812,935 B2 * | 10/2010 | Cowburn et al. | 356/71 |
| 2001/0048968 A1 | 12/2001 | Cox et al. | |
| 2002/0185857 A1 | 12/2002 | Taylor et al. | |
| 2003/0112523 A1 | 6/2003 | Daniell | |
| 2003/0179364 A1 | 9/2003 | Steenblik et al. | |
| 2003/0183695 A1 | 10/2003 | Labrec et al. | |
| 2003/0228014 A1 | 12/2003 | Alasia et al. | |
| 2003/0232179 A1 | 12/2003 | Steenblik et al. | |
| 2004/0100707 A1 | 5/2004 | Kay et al. | |
| 2004/0140665 A1 | 7/2004 | Scarbrough et al. | |
| 2005/0094274 A1 | 5/2005 | Souparis | |
| 2005/0180020 A1 * | 8/2005 | Steenblik et al. | 359/626 |
| 2006/0003295 A1 * | 1/2006 | Hersch et al. | 434/110 |
| 2006/0017979 A1 | 1/2006 | Goggins | |
| 2006/0018021 A1 | 1/2006 | Tomkins et al. | |
| 2006/0227427 A1 | 10/2006 | Dolgoff | |
| 2007/0058260 A1 | 3/2007 | Steenblik et al. | |
| 2007/0183047 A1 | 8/2007 | Phillips et al. | |
| 2007/0284546 A1 * | 12/2007 | Ryzi et al. | 250/492.3 |
| 2008/0130018 A1 | 6/2008 | Steenblik et al. | |
| 2010/0068459 A1 | 3/2010 | Wang et al. | |

FOREIGN PATENT DOCUMENTS

| | | | |
|---|---|---|---|
| DE | 19932240 | | 1/2001 |
| EP | 0118222 | | 9/1984 |
| EP | 0203752 | * | 3/1986 |
| EP | 0318717 | | 6/1989 |
| EP | 0930174 | | 7/1999 |
| GB | 1095286 | | 12/1967 |
| GB | 2362493 | | 11/2001 |
| JP | 1966-004953 | | 3/1966 |
| JP | 1971-022600 | | 8/1971 |
| JP | 1999-189000 | | 7/1999 |
| JP | 11189000 | | 7/1999 |
| JP | 2000-256994 | | 9/2000 |
| JP | 2001-055000 | | 2/2001 |
| JP | 2003039583 | | 2/2003 |
| JP | 2003-165289 | | 6/2003 |
| JP | 2004-262144 | | 9/2004 |
| KR | 10-0194536 | | 6/1999 |
| RU | 2111125 | | 5/1998 |
| RU | 2245566 | | 1/2005 |
| WO | WO 97/19820 | | 6/1997 |
| WO | WO 97/44769 | | 11/1997 |
| WO | WO 98/13211 | | 4/1998 |
| WO | WO 98/15418 | | 4/1998 |
| WO | WO 98/26373 | | 6/1998 |
| WO | WO 99/26793 | | 6/1999 |
| WO | WO 99/66356 | | 12/1999 |
| WO | WO 01/11591 | | 2/2001 |
| WO | WO 01/39138 | | 5/2001 |

| WO | WO 01/63341 | 8/2001 |
| WO | WO 02/40291 | 5/2002 |
| WO | WO 03/005075 | 1/2003 |
| WO | WO 03/007276 | 1/2003 |
| WO | WO 03/022598 | 3/2003 |
| WO | WO 03/053713 | 7/2003 |
| WO | WO 03/061980 | 7/2003 |
| WO | WO 03/082598 | 10/2003 |
| WO | WO 03/098188 | 11/2003 |
| WO | WO 2004/036507 | 4/2004 |
| WO | WO 2004/087430 A1 | 10/2004 |
| WO | WO2005/106601 * | 11/2005 |
| WO | WO 2005/106601 A2 | 11/2005 |

OTHER PUBLICATIONS

Hutley, M.C., "Integral Photography, Superlenses and the Moiré Magnifier", European Optical Society, 1993, pp. 72-75, vol. 2, UK.

Hutley, M., et al., "Microlens Arrays", Physics World, Jul. 1991, pp. 27-32.

Kamal, H., et al., "Properties of Moiré Magnifiers", Opt. Eng., Nov. 1998, pp. 3007-3014, vol. 37, No. 11.

Lippmann, G., "Photgraphie—Épreuves Réversibles, Photographies Intégrals", Académie des Sciences, 1908, pp. 446-451, vol. 146, Paris.

Liu, S., et al., "Artistic Effects and Application of Moiré Patterns in Security Holograms", Applied Optics, Aug. 1995, pp. 4700-4702, vol. 34, No. 22.

Zhang, X., et al., "Concealed Holographic Coding for Security Applications by Using a Moiré Technique", Applied Optics, Nov. 1997, pp. 8096-8097, vol. 36, No. 31.

Fletcher, D.A., et al., "Near-field infrared imaging with a microfabricated solid immersion lens", Applied Physics Letters, Oct. 2, 2000, pp. 2109-2111, vol. 77, No. 14.

Extended European Search Report dated Jan. 11, 2012 for European Divisional Patent Publication No. 2335944.

Phillips, Roger W., et al., Security Enhancement of Holograms with Interference Coatings, Optical Security and Counterfeit Deterrence Techniques III, 2000, pp. 304-316, vol. 3973, San Jose, CA.

* cited by examiner

MICRO-OPTIC FILM STRUCTURE THAT ALONE OR TOGETHER WITH A SECURITY DOCUMENT OR LABEL PROJECTS IMAGES SPATIALLY COORDINATED WITH STATIC IMAGES AND/OR OTHER PROJECTED IMAGES

RELATED APPLICATION

This application claims the benefit of U.S. Provisional Patent Application Ser. No. 60/800,257, filed May 12, 2006, which is fully incorporated herein by reference.

TECHNICAL FIELD

The present invention generally relates to optical systems for projecting images, and more specifically relates to a micro-optic film structure that alone or together with a security document or label projects images spatially coordinated with static images and/or other projected images, the static images and/or other projected images serving to either visually enhance or cancel the projected images.

BACKGROUND AND SUMMARY OF THE INVENTION

Optical materials have long been recognized as valued additions to security threads used in banknotes. These materials allow for a variety of self-authenticating optical effects while rendering the security thread and thus the banknote more resistant to counterfeiting.

By way of example, U.S. Patent Application Publication No. 2005/0180020 A1 to Steenblik et al. depicts a film material that employs a regular two-dimensional array of non-cylindrical lenses to enlarge micro-images. The film material or structure comprises (a) one or more optical spacers; (b) a regular periodic planar array of image icons positioned on one surface of the optical spacer; and (c) a regular periodic array of lenses positioned on an opposing surface of the optical spacer. The lenses are described as being polygonal base multi-zonal lenses, lenses providing enlarged fields of view over the width of the associated image icons so that the peripheral edges of the associated image icons do not drop out of view, or aspheric lenses having effective base diameters of less than 50 microns. For currency, document and product security applications requiring total film thicknesses of less than 50 microns, this reference teaches that the effective base diameter of the lens must be less than 50 microns, and that the focal length of the lens must be less than 40 microns. The images projected by this film structure reportedly show a number of visual effects including orthoparallactic movement.

These micro-optic film structures, in the form of security strips or threads, are either mounted on a surface of a security document (e.g., banknote), or are partially embedded within the document, with the film structures being visible in clearly defined windows on a surface of the document.

In order to preserve the optical effect of the micro-optic film structure when used on or within a security document, print is applied to opposing surfaces of the document so as to avoid or minimize print in the area of the film structure.

By way of the present invention, it has been discovered that printing in the area of the film structure does not impair the film structure's optical performance, and in fact, can be used to enhance or cancel the images projected by such micro-optic film structures, rendering these devices more visually attractive and thus more effective as a public security feature.

The present invention therefore provides an at least partially transparent micro-optic film structure, which projects one or more first synthetic optical images and optionally one or more second synthetic optical images, wherein the one or more first synthetic optical images are spatially coordinated with (i) one or more static images, (ii) one or more second synthetic optical images, or (iii) a combination of one or more static images and one or more second synthetic optical images.

In one contemplated embodiment, the inventive micro-optic film structure projects one or more first synthetic optical images, which are spatially coordinated with one or more static images, and basically comprises:
  (a) one or more polymer film materials;
  (b) one or more planar arrangements of primary image icons located on or within a polymer film material; and
  (c) one or more planar arrangements of focusing elements or lenses located on either a polymer film material or a planar arrangement of primary image icons,
    wherein, the planar arrangements are configured such that when a planar arrangement of primary image icons is viewed through a planar arrangement of focusing elements or lenses, one or more first synthetic optical images are projected; and
  (d) one or more secondary image icons directly or indirectly superimposed upon or formed through one or more primary image icons and/or one or more focusing elements or lenses,
    wherein, the one or more secondary image icons appear as static images spatially coordinated with the one or more first synthetic optical images projected by the film structure,
  wherein, when the static images are viewed with the one or more first synthetic optical images, the static images visually enhance or cancel the projected images.

As will be evident to one skilled in the art from the above descriptions, synthetic optical images are images formed and projected by/through a planar arrangement of focusing elements or lenses when the primary (and possibly also secondary) image icons are placed on or within the focal plane(s) of the focusing elements or lenses. As will also be evident from the above descriptions, static images are images resulting from placement of the image icons (e.g., printed information) outside the focal plane(s) of the focusing elements or lenses. As such, while these image icons may be directly viewed, or viewed through the micro-optic film structure, the image icons are not imaged and projected by the film structure's planar arrangement of focusing elements or lenses.

The present invention further provides a security document or label having opposing surfaces and comprising at least one micro-optic film structure, as defined above, partially embedded in and/or mounted on a surface of the security document or label.

In one contemplated embodiment of the inventive security document or label, the secondary image icons are directly superimposed on the primary image icons and/or on the focusing elements of the micro-optic film structure by, for example, printing the secondary image icons directly thereon, the film structure being partially embedded in the security document or label and visible in clearly defined windows on a first or upper surface thereof.

In another contemplated embodiment, the film structure is again partially embedded in the security document or label, the secondary image icons being indirectly superimposed on the primary image icons by, for example, printing the secondary image icons on an opposing second or lower surface of the document or label overlying the embedded film structure. In the alternative, or in addition to the secondary image icons located on the lower surface of the document or label, the secondary image icons may be indirectly and/or directly applied to the focusing elements by, for example, printing the secondary image icons directly on and/or between the windowed regions on the upper surface of the document or label.

The present invention further provides a method for authenticating the micro-optic film structure and security document or label, as defined above, which comprises:
  (a) directing a coherent light source (e.g., a laser pointer) at a shallow angle over the planar arrangement of focusing elements or lenses of the micro-optic film structure to project a unique pattern;
  (b) detecting the unique projected pattern; and
  (c) comparing the detected unique projected pattern to expected patterns.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings, in which:

FIGS. 6(A)-(D) are plan views illustrating an embodiment of the present invention where projected images (which are magnified and show orthoparallactic movement) and secondary image icons (which appear as static images) are spatially coordinated and where upon tilting the inventive security document or label, the projected images match the static images;

FIGS. 7(A)-(D) are plan views illustrating another embodiment of the present invention where projected images (which are magnified and show orthoparallactic movement) and secondary image icons (which appear as static images) are spatially coordinated, and where upon tilting the inventive security document or label, the projected images and the static images together form a different image;

FIGS. 8(A)-(C) are plan views illustrating yet another embodiment of the present invention where projected images (which are magnified and show orthoparallactic movement) and secondary image icons (which appear as static images) are spatially coordinated, and where upon tilting the inventive security document or label, apparent movement of the projected images is amplified; and FIGS. 9(A)-(D) are plan views of a further embodiment of the present invention where projected images (which are magnified and show orthoparallactic movement) and secondary image icons (which appear as static images) are spatially coordinated, and where upon tilting the inventive security document or label, the projected images and the static images are canceled out and thus no longer visible or discernible.

BEST MODE FOR CARRYING OUT THE INVENTION

One of the objectives of banknote designers is to employ easily recognizable overt security features that attract the attention of the general public. These overt security features must be difficult to counterfeit or simulate, and should be easily recognizable as genuine in the short time available during a normal transaction, ideally without the need for an additional device. Preferred embodiments of the present invention greatly increase the ability of known micro-optic film structures to attract the attention of the general public, thereby enhancing the effectiveness of this overt security feature.

Although the film structure of the present invention will be described herein mainly as a security strip or thread used in association with banknotes, the invention is not so limited. The film structure of the present invention can be utilized in a variety of different forms with any document (e.g., banknote, passport, identity card, credit card), label, means of identification, commercial product (e.g., optical disks, CDs, DVDs, packages of medical drugs), etc., for authentication purposes.

The polymer film material(s) of the inventive film structure is a light-transmitting support layer which may also function as an optical spacer. Polymer film material(s) may be formed using one or more essentially colorless polymers selected from the group including, but not limited to, polyester, polyethylene, polyethylene terephthalate, polypropylene, polyvinyl carbonate, polyvinylidene chloride, and combinations thereof.

The thickness of the polymer film material(s) preferably ranges from about 12 to about 26 microns (more preferably from about 17 to about 21 microns).

The one or more planar arrangements of focusing elements or lenses of the inventive film structure, which project images that may be magnified and/or show one or more visual effects, are preferably selected from the group of:
  i. one or more planar arrangements of cylindrical or non-cylindrical lenses;
  ii. one or more planar arrangements of focusing reflectors;
  iii. one or more opaque layers containing a plurality of apertures; and
  iv. one or more reflective layers.

In a more preferred embodiment, non-cylindrical lenses having a spheric or aspheric surface are employed. Aspheric surfaces include conical, elliptical, parabolic and other profiles. These lenses may have circular, oval, or polygonal base geometries, and may be arranged in regular or random, one- or two-dimensional arrays. In yet a more preferred embodiment, the focusing elements are aspheric lenses having polygonal (e.g., hexagonal) base geometries that are arranged in a regular, two-dimensional array on the polymer film material(s).

The subject focusing elements or lenses have preferred widths (in the case of cylindrical lenses) and base diameters (in the case of non-cylindrical lenses) of less than 50 microns (more preferably, less than about 45 microns, and most preferably, from about 10 to about 40 microns), preferred focal lengths of less than 50 microns (more preferably, less than about 45 microns, and most preferably, from about 10 to about 30 microns), and preferred f-numbers of less than or equal to 2 (more preferably, less than or equal to 1).

The primary image icons used in the practice of the present invention may take any form including, but not limited to, positive or negative symbols, letters and/or numerals that may be visually detected and possibly machine detected or machine read. Although these icons may be printed using, for example, the printing methods and security inks (e.g., infrared inks) noted below for the secondary image icons, image icons formed from voids or recesses and raised image icons formed by casting or heat pressure processes, are preferred.

In one embodiment contemplated by the present invention, the primary image icons are optionally coated and/or filled voids or recesses formed on or within the one or more polymer film materials. These icon types, which have an aspect ratio (i.e., width-to-height ratio) equal to 1, and which are associated with only one focusing element or lens, are described in detail in U.S. Patent Application Publication No. 2005/0180020 A1 to Steenblik et al.

For those embodiments where the image icons constitute filled recesses, light-converting or luminescent materials may be added to the material (e.g., a substantially transparent or clear radiation curable resinous material) used to fill the recesses. These materials may be added in amounts ranging from about 2 to about 30% by weight (preferably, from about 5 to about 10% by weight), based on the total weight of the fill material. When added in particle form to the fill material, the average particle size of these light-converting or luminescent materials is less than or equal to about 2 microns (preferably, less than or equal to about 1 micron).

In addition, image icons formed as recesses by a substantially transparent, colorless or light-colored resin or resinous material may be filled with one or more magnetic materials such as, for example, magnetic inks.

The images projected by the micro-optic film structure of the present invention may be magnified and/or show one or more visual effects.

Magnification of the projected image(s) is determined by a number of factors such as the degree of 'skew' between the symmetry axes of the planar arrangements of focusing elements or lenses and primary image icons. As will be readily appreciated by those skilled in the art, a small skew causes a large magnification, while a large skew causes a small magnification. Other factors, such as the relative scales of the two planar arrangements and the f-number of the lenses can affect both the magnification of the projected image(s) as well as its rotation, orthoparallactic movement, and apparent visual depth. The f-number is defined as the quotient obtained by dividing the focal length of the lens (f) by the effective maximum diameter of the lens (D).

Considering possible visual effects, in one embodiment in which the micro-optic film structure comprises a polymer film material having regular, two-dimensional arrays of non-cylindrical lenses and image icons (e.g., filled recesses) on opposing surfaces, when viewed from a location above an upper surface, whether in reflective or transmitted light, projects one or more images that:
  i. show orthoparallactic movement as the film structure is tilted or viewed from different viewing angles;
  ii. appear to lie on a spatial plane deeper than the thickness of the film structure;
  iii. appear to lie on a spatial plane above a surface of the film structure;
  iv. oscillate between a spatial plane deeper than the thickness of the film structure and a spatial plane above a surface of the film structure as the structure is azimuthally rotated;
  v. transform from one form, shape, size and/or color into a different form, shape, size and/or color as the film structure is either azimuthally rotated or viewed from different viewpoints;
  vi. appear as a three-dimensional image(s); and/or
  vii. upon illumination of the film structure, appears to have a shadow that lies in the spatial plane of the film structure.

As described in U.S. Patent Application Publication No. 2005/0180020 A1 to Steenblik et al., orthoparallactic effects result from a "scale ratio" (i.e., the ratio of the repeat period of the image icons or indicia to the repeat period of the focusing elements or lenses) substantially equal to 1.0000, when the symmetry axes of the focusing elements and image icons or indicia are misaligned. The appearance of resting on a spatial plane deeper than the thickness of the film structure results from a "scale ratio" of less than 1.0000, when the symmetry axes of the focusing elements and image icons or indicia are substantially aligned, while the appearance of resting on a spatial plane above a surface of the film structure results from a "scale ratio" of greater than 1.0000, when the symmetry axes of the focusing elements and image icons or indicia are substantially aligned. The appearance of oscillating between a spatial plane deeper than the thickness of the film structure and a spatial plane above a surface of the film structure as the structure is azimuthally rotated results from axially asymmetric values of the scale ratio (e.g., 0.995 in the X direction, and 1.005 in the Y direction).

In a preferred embodiment, when the planar arrangement of primary image icons is viewed through the planar arrangement of focusing elements or lenses, one or more synthetically magnified images are projected, which show orthoparallactic movement as the film structure is tilted or viewed from different viewing angles.

The secondary image icon(s), which may appear as a static image(s) or other projected image(s), is viewable in visible (reflected and/or transmitted), ultraviolet, or infrared light, and is spatially coordinated with the projected first synthetic optical image(s) of the micro-optic film structure. When displayed with the projected image(s), the secondary image icon(s), which preferably constitutes a substantially fixed or static point of reference, serves to visually enhance (e.g., compliment, complete) the projected image(s) or to cancel it (e.g., render the projected image(s) indiscernible to an unaided eye).

When serving to visually enhance the projected image(s), the position, overall size, shape, spacing, and color of the secondary image icon(s) are chosen so as to work together harmoniously with the projected image(s). Visual enhancements effected by way of the secondary image icons may constitute: (i) a change in the color, optical density, or luminosity of the projected image(s) or its background; (ii) formation of one or more new images or icons; (iii) amplification of apparent movement of the projected image(s); and the like.

When serving to cancel the projected image(s), the secondary image icon(s) is a negative or reverse likeness of the projected image(s) such that when the projected and static images merge, cancellation occurs.

For secondary image icons viewable in visible light, their placement relative to the micro-optic film structure will determine whether they are visible in reflected and/or transmitted light. More specifically, when viewing the windowed film structure from a first or upper surface of a security document or label, secondary image icons applied directly to the focusing elements or lenses of the film structure are viewable in the window regions in reflected and transmitted light, while secondary image icons applied indirectly to the primary image icons (e.g., printing the secondary image icons on an opposing second or lower surface of the document or label overlying the embedded film structure) are viewable only in transmitted light. Adequately sized secondary image icons applied directly to the primary image icons may be viewable in the window regions in reflected and transmitted light.

Figure 1:
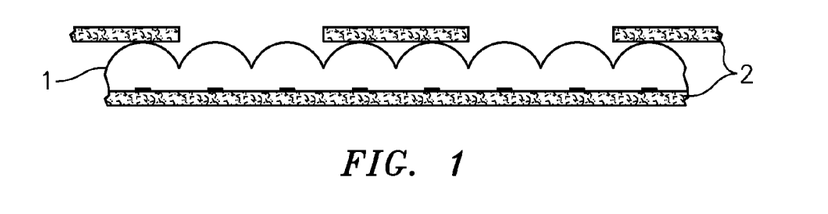
FIG. 1 is a cross-sectional view of a micro-optic film structure, as described in U.S. Patent Application Publication No. 2005/0180020 A1 to Steenblik et al., that is partially embedded in a security document such as a banknote.

Referring now to FIG. 1 of the drawings, a micro-optic film structure 1, as described in U.S. Patent Application Publication No. 2005/0180020 A1 to Steenblik et al., is shown partially embedded in a security document such as a banknote 2.

Figures 2, 3, 4, 5:
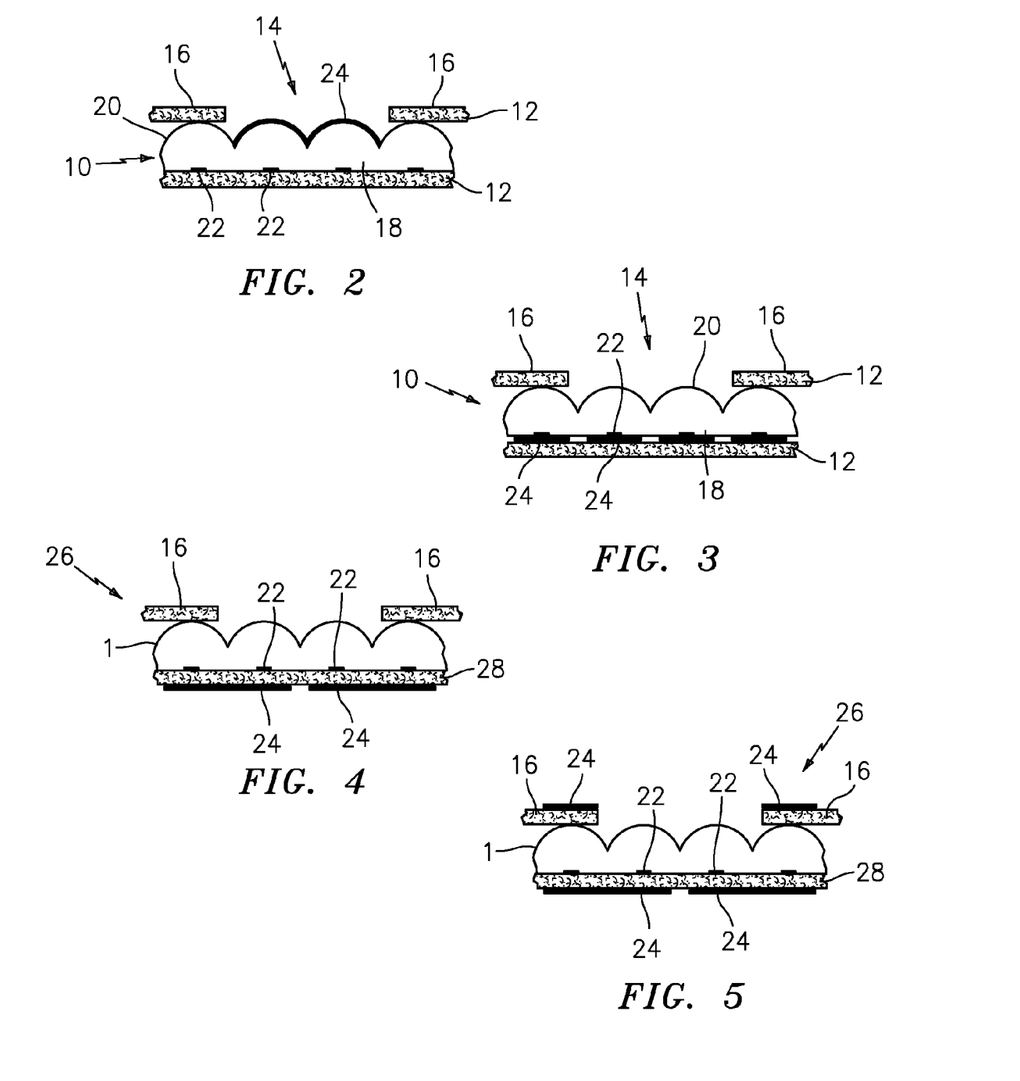
FIG. 2 is a cross-sectional view of one embodiment of the micro-optic film structure of the present invention that is partially embedded in a security document, where the secondary image icons are superimposed directly on the focusing elements or lenses of the film structure.
FIG. 3 is a cross-sectional view of another embodiment of the partially embedded micro-optic film structure of the present invention, where the secondary image icons are superimposed directly on the primary image icons of the film structure.
FIG. 4 is a cross-sectional view of yet another embodiment of the partially embedded micro-optic film structure of the present invention, where the secondary image icons are superimposed indirectly on the primary image icons of the film structure by applying same to a second or lower surface of the security document.
FIG. 5 is a cross-sectional view of yet another embodiment of the partially embedded micro-optic film structure of the present invention, where the secondary image icons are applied to both the upper and lower surfaces of the security document.

In FIGS. 2 and 3, a preferred embodiment of the micro-optic film structure of the present invention is shown generally at 10. The micro-optic film structure 10 is shown in these drawings as partially embedded in a security document or label 12, visible through openings or windows 14 present on an upper surface 16 of the document or label 12.

The inventive film structure 10 comprises: a polymer film material 18; a regular, two dimensional array of focusing elements or lenses 20 in the form of aspheric lenses having hexagonal base geometries; a regular, two dimensional array of primary image icons 22 in the form of filled recesses; and secondary image icons 24 either directly superimposed upon one or more focusing elements or lenses 20 (FIG. 2), or directly superimposed upon one or more primary image icons 22 (FIG. 3). In FIG. 2, the secondary image icons 24 appear as static images spatially coordinated with the projected image(s). In FIG. 3, each secondary image icon 24 is sized smaller than each lens 20 in the array, thereby allowing a synthetic image (i.e., a second synthetic optical image) to be projected through the lens array. If, however, the secondary image icon 24 is sized larger than each lens 20, a static image (and not a projected synthetic image) would result.

In FIG. 4, a preferred embodiment of the security document or label of the present invention is shown generally at 26. The micro-optic film structure of FIG. 1 is shown partially embedded in the security document or label 26, with secondary image icons 24 applied to a second or lower surface 28 of the document or label 26 overlying the primary image icons 22, and spatially coordinated with the projected image(s). As will be readily apparent to one skilled in the art, the light-transmitting nature of the film structure 1 allows for both the primary and secondary image icons 22, 24 to be viewed simultaneously from an upper surface of the document or label 26.

In another contemplated embodiment (not shown), which is similar to that shown in FIG. 4, the micro-optic film structure 1 is back coated with an ultraviolet (UV) coating, and the secondary image icons 24 printed on the second or lower surface 28 of the document or label 26 with a UV security ink. In this embodiment, visual enhancements effected by way of the secondary image icons 24 would be apparent only under UV illumination.

In FIG. 5, secondary image icons 24 are applied to both the upper and lower surfaces 16, 28 of the document or label 26. Although not shown in the drawings, the secondary image icons 24 may be applied over both windowed and embedded regions of the film structure.

Several ways in which the projected images may be spatially coordinated with, or married to the secondary image icons 24 are shown in FIGS. 6 to 9. In these drawings, the micro-optic film structure 10 of the present invention, shown in part (B) of each drawing as partially embedded in a security document or label, projects one or more images that show orthoparallactic movement. As the film structure 10 is tilted the projected images move in a direction of tilt that appears to be perpendicular to the direction anticipated by normal parallax. In other words, as the film structure 10 is tilted from side to side, the projected image(s) appears to move up and down. The secondary image icons 24 are applied (e.g., printed) over the exposed or windowed portions of the film structure 10 on a first or upper surface of the security document or label. As such, icons 24 would be present on portions of the upper surface of the security document or label as well as on the focusing elements or lenses 20 of the micro-optic film structure 10 and would constitute substantially fixed or static points of reference.

Figure 6:
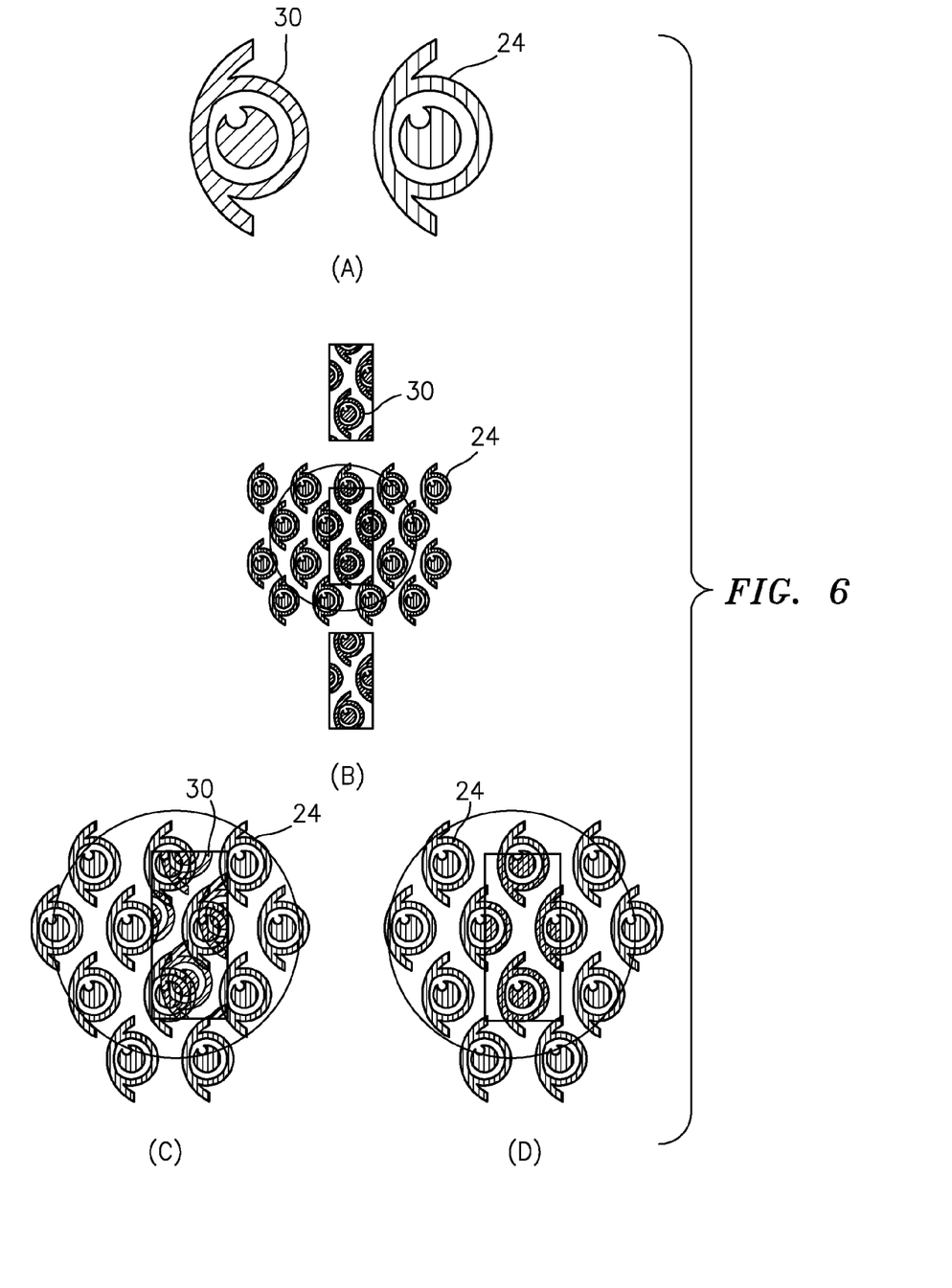

In FIG. 6, the projected images 30 are in the form of colored "eye" symbols, while the secondary image icons 24 appear as static images having the same size and shape as the projected "eye" symbols, but are of a different color. As best shown in parts (C) and (D) of FIG. 6, which are enlarged views of the encircled area shown in part (B), when viewed in reflected or transmitted light, the overlapping sets of colored "eye" symbols appear in random or haphazard locations (part (C)), but when the security document or label is tilted to a certain angle, the "eye" symbols become superimposed and adopt a different color (part (D)).

Figure 7:
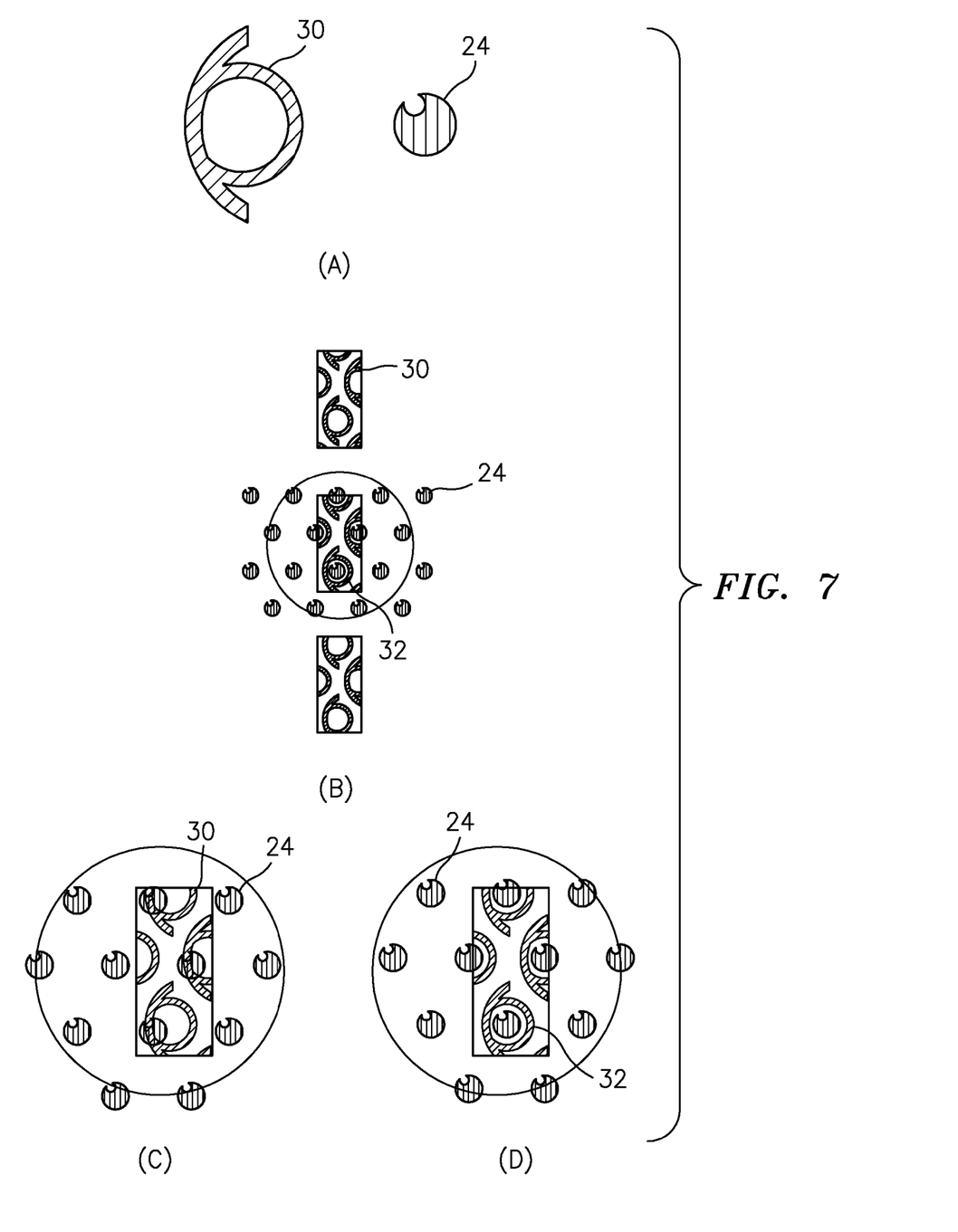

In FIG. 7, the projected images 30 and the secondary image icons 24 are interrelating images/icons. In this embodiment, the projected images 30 are partially formed "eye" symbols (i.e., eye outline), while the secondary image icons 24 appear as static images in the shape of an eye pupil sized to fit within a projected image 30. As best shown in parts (C) and (D) of FIG. 7, when viewed in reflected or transmitted light, the overlapping sets of partially formed "eye" symbols and pupils appear in random or haphazard locations (part (C)), but when the security document or label is tilted to a certain angle, the pupils become properly placed within the partially formed "eye" symbols thereby forming a new image 32 (part (D)).

Other examples of interrelating images/icons include, but are not limited to, two parts of a geometric form (e.g., a square, a circle, a diamond) or design (e.g., a logo, portrait, coat of arms), two numerals that together form a new numeral, two groups of letters that together form a word, two words that together form a phrase, and the like.

Figure 8:
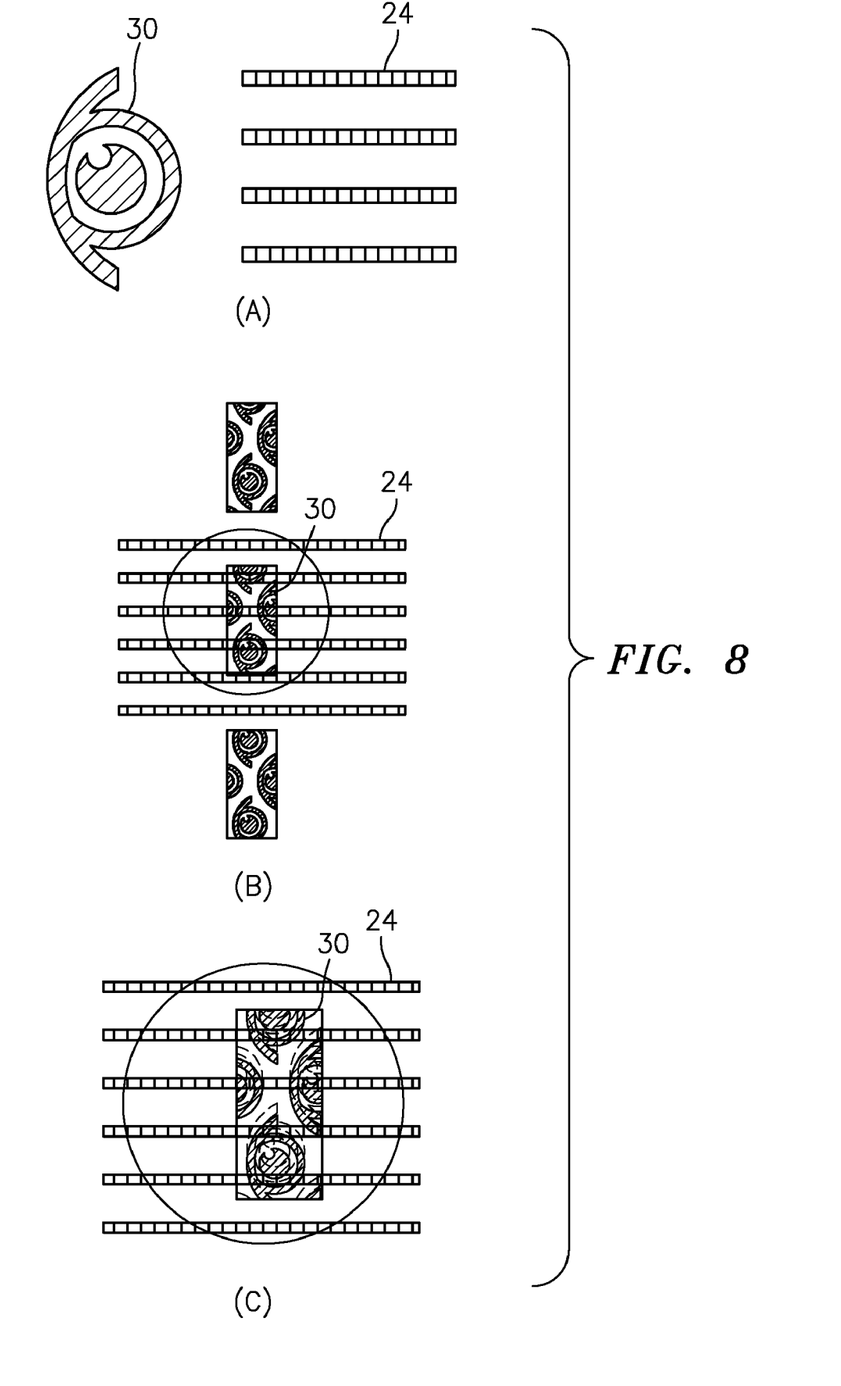

In FIG. 8, the projected images 30 are in the form of colored "eye" symbols, while the secondary image icons 24 are in the form of printed parallel lines. As best shown in part (C) of FIG. 8, when viewed in reflected or transmitted light, as the security document or label is tilted, the printed parallel lines emphasize or amplify the apparent movement of the projected "eye" symbols. The use of different frequencies of parallel lines will cause the projected "eye" symbols to appear to move at different rates of speed, while the use of blind embossing techniques to form the parallel lines will cause a "shimmering" or "water ripple" type of special effect similar to that produced by a rippling pool of water upon lane lines painted on the bottom of an in-ground pool.

Other patterns that serve to emphasize or amplify the apparent movement of the projected image(s) include, but are not limited to, other plain patterns (e.g., line patterns, dot patterns) and security type patterns (e.g., intricate webbing or guilloche patterns, vignettes).

Figure 9:
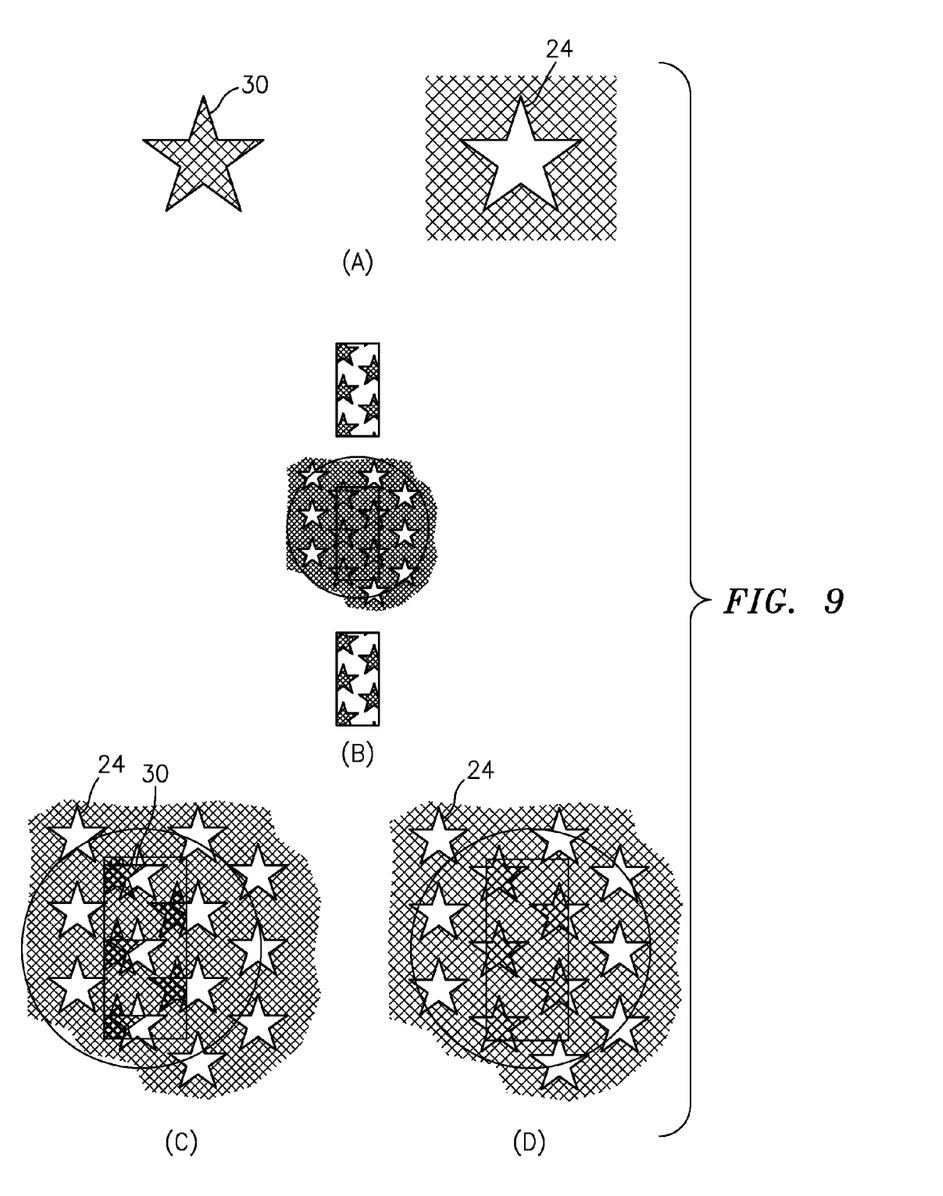

In FIG. 9, the projected images 30 and the secondary image icons 24 are canceling images/icons. In this embodiment, the projected images 30 are in the form of positive "star" symbols, while the secondary image icons 24 are in the form of negative "star" symbols. As best shown in parts (C) and (D) of FIG. 9, when viewed in reflected or transmitted light, the overlapping sets of positive and negative "star" symbols appear in random or haphazard locations (part (C)), but when the security document or label is tilted to a certain angle, the positive "star" symbols align with the negative "star" symbols having a canceling effect which renders these symbols no longer detectable (part (D)).

In addition to visually enhancing or canceling the image(s) projected by the micro-optic film structure, the secondary image icon(s) 24 may itself constitute or embed a security feature (e.g., tilt-effect security features, machine detectable and/or machine readable security features), or it may contribute to the production of one or more machine detectable and/or machine readable security features.

By way of example, the secondary image icon(s) 24 may demonstrate color shift or tilt-effect. Contemplated embodiments include secondary image icons 24 that are printed with optically variable inks, secondary image icons 24 that are made up of (or that contain) holographic patches or stripes, or latent images, and secondary image icons 24 that are formed using blind embossing.

In addition, the secondary image icon(s) 24 may be used to hide or obscure information. In one such contemplated embodiment, the secondary image icon(s) 24 embeds SC (Steganography Cryptography) markings and/or digital watermarks, thereby allowing for covert, anti-copy capability without having to integrate conventional printed covert marking systems into the security document (e.g., banknote) or label.

By way of further example, the secondary image icon(s) 24 may be formed with a material that generates a signal, which may be the same as or different from any signal that may be generated by the primary image icon(s) 22. In one such contemplated embodiment, secondary image icons 24 are printed using a high coercivity security ink, while primary image icons 22, in the form of recesses, are filled with a low coercivity material. The proximity of these materials generates a unique magnetic signal or response that may be used for authentication purposes.

As described and shown herein above, the secondary image icon(s) 24 of the present invention, which serves to visually enhance or cancel images projected by the micro-optic film structure, may be present in a number of different shapes and forms, may be visible or invisible under normal lighting conditions, and may itself constitute or embed a security feature, or contribute to the production of one or more machine detectable and/or machine readable security features.

Methods or techniques suitable for forming the secondary image icons 24 on or through a surface of the micro-optic film structure 10, or on or through a surface of a document or label overlying the film structure 10 are not limited and include, but are not limited to, embossing (e.g., blind embossing), foil transfer, microscopic laser boring techniques, metallization methods (e.g., selective metallization, metallization and selective demetallization), and printing.

In one contemplated embodiment, the secondary image icons 24 are printed icons. These icons 24 are preferably printed using water-based security inks. Security inks contemplated for use in this invention include, but are not limited to, visible and partially visible security inks such as heat reactive-irreversible inks, high coercivity inks, magnetic inks, metal or metallic inks, optically variable inks (e.g., color shift inks, fluorescent inks, metameric inks, pearlescent inks, phosphorescent inks), photochromic inks, radiation curable inks (e.g., UV curable inks), solvent/chemical reactive inks and thermochromic inks, as well as UV inks and infrared (IR) inks.

The secondary image icons 24 may be printed on film structure 10 or security document or label 26 using any printing method including, but not limited to, rotogravure, letterpress, intaglio, lithography, and flexography.

In another contemplated embodiment, the secondary image icons 24, in the form of optically variable holographic foil patches or stripes are applied using conventional foil transfer techniques to a surface of the security document or label 26.

In yet another contemplated embodiment, the secondary image icons 24 are in the form of microscopic laser bored holes that extend completely though film structure 10 or security document or label 26, or that extend only through the second or lower surface 28 of document or label 26 in an area(s) overlying the embedded film structure. Due to the microscopic nature of the holes, the secondary image icons 24 in this embodiment would be visible only in transmitted light.

In a further embodiment, the secondary image icons 24 are metal (i.e., positive) icons or metal-formed (i.e., negative) icons that are applied to the film structure 10 or security document or label 26 using either selective metallization techniques or metallization and selective demetallization techniques.

As will be readily appreciated by those skilled in the art, the secondary image icon(s) 24, while serving to visually enhance or cancel the projected image(s), also renders the micro-optic film structure 10 and security document or label 26 of the present invention more counterfeit resistant, by providing additional ways in which to verify authenticity. In fact, by way of the present invention, it has been discovered that unique patterns can be projected by structure 10 and document or label 26 by directing a coherent light source (e.g., laser pointer) at a shallow angle over the focusing elements or lenses 20 of the film structure. Such unique projected light patterns can be used for high level authentication purposes, where these patterns can only be formed by a lens array of proper scale and spacing.

While various embodiments of the present invention have been described above, it should be understood that they have been presented by way of example only, and not limitation. Thus, the breadth and scope of the present invention should not be limited by any of the exemplary embodiments.

Having thus described the invention, what is claimed is:

1. A micro-optic film structure having one or more planar arrangements of focusing elements, which projects one or more synthetic optical images through the one or more planar arrangements of focusing elements, and one or more static images, which are viewed through the one or more planar arrangements of focusing elements without being projected thereby, wherein the one or more synthetic optical images are spatially coordinated with the one or more static images in such a manner that when viewed simultaneously the one or more synthetic optical images are:

visually enhanced by the one or more static images due to their mutual spatial arrangement through: (a) forming a legible phrase; and/or (b) amplifying apparent movement of the one or more synthetic optical images, wherein the one or more static images are in the form of a pattern selected from the group of line patterns, dot patterns, intricate webbing or quilloche patterns, or vignettes; or canceled or rendered visually undetectable by the one or more static images due to their mutual spatial arrangement, wherein the one or more static images are negative or reverse likenesses of the one or more synthetic optical images.

2. The micro-optic film structure of claim 1, wherein the one or more synthetic optical images are magnified images.

3. The micro-optic film structure of claim 1, which comprises:
(a) one or more polymer film materials;
(b) one or more planar arrangements of image icons located on or within a polymer film material; and
(c) one or more planar arrangements of focusing elements located on or near a polymer film material or a planar arrangement of image icons,
wherein, the planar arrangements are configured such that when a planar arrangement of image icons is viewed through a planar arrangement of focusing elements, one or more synthetic optical images are projected; and
(d) one or more static images directly or indirectly superimposed upon or formed through one or more image icons and/or one or more focusing elements,
wherein, the one or more static images are spatially coordinated with the one or more synthetic optical images,
wherein, when the static images are viewed with the one or more synthetic optical images projected by the film structure, the static images visually enhance or cancel the one or more projected images.

4. The micro-optic film structure of claim 3, wherein the one or more image icons are optionally filled voids or recesses formed on or within the one or more polymer film materials.

5. The micro-optic film structure of claim 4, wherein the one or more image icons are filled voids or recesses formed on or within the one or more polymer film materials.

6. The micro-optic film structure of claim 3, wherein the one or more synthetic optical images are magnified images.

7. The micro-optic film structure of claim 3, wherein the one or more static images are printed icons.

8. The micro-optic film structure of claim 3, wherein the one or more static images are in the form of optically variable holographic foil patches or stripes.

9. The micro-optic film structure of claim 1, wherein the one or more synthetic optical images are visually enhanced by the one or more static images due to their mutual spatial arrangement through forming a legible phrase.

10. The micro-optic film structure of claim 1, wherein the one or more synthetic optical images are visually enhanced by the one or more static images due to their mutual spatial arrangement through amplifying apparent movement of the one or more synthetic optical images, wherein the one or more static images are in the form of a pattern selected from the group of line patterns, dot patterns, intricate webbing or guilloche patterns, or vignettes.

11. The micro-optic film structure of claim 1, wherein the one or more synthetic optical images are canceled or rendered visually undetectable by the one or more static images due to their mutual spatial arrangement, wherein the one or more static images are negative or reverse likenesses of the one or more synthetic optical images.

12. A micro-optic film structure, which comprises:
(a) one or more polymer film materials;
(b) one or more planar arrangements of image icons located on or within a polymer film material; and
(c) one or more planar arrangements of focusing elements located on or near a polymer film material or a planar arrangement of image icons,
wherein, the planar arrangements are configured such that when a planar arrangement of image icons is viewed through a planar arrangement of focusing elements, one or more synthetic optical images are projected; and
(d) one or more static images directly or indirectly superimposed upon or formed through one or more image icons and/or one or more focusing elements,
wherein, the one or more static images are viewed directly, or viewed through the one or more planar arrangements of focusing elements without being projected thereby,
wherein, the one or more synthetic optical images are spatially coordinated with the one or more static images in such a manner that when viewed simultaneously the one or more synthetic optical images are:
visually enhanced by the one or more static images due to their mutual spatial arrangement through: (a) forming one or more new images or icons with the one or more static images; and/or (b) amplifying apparent movement of the one or more synthetic optical images, wherein the one or more static images are in the form of a pattern selected from the group of line patterns, dot patterns, intricate webbing or guilloche patterns. or vignettes; or
canceled or rendered visually undetectable by the one or more static images due to their mutual spatial arrangement, wherein the one or more static images are negative or reverse likenesses of the one or more synthetic optical images,
wherein the one or more synthetic optical images are magnified images,
wherein the one or more magnified synthetic optical images show orthoparallactic movement as the film structure is tilted or viewed from different viewing angles.

13. A micro-optic film structure, which comprises:
(a) one or more polymer film materials;
(b) one or more planar arrangements of image icons located on or within a polymer film material; and
(c) one or more planar arrangements of focusing elements located on or near a polymer film material or a planar arrangement of image icons,
wherein, the planar arrangements are configured such that when a planar arrangement of image icons is viewed through a planar arrangement of focusing elements, one or more synthetic optical images are projected; and
(d) one or more static images directly or indirectly superimposed upon or formed through one or more image icons and/or one or more focusing elements,
wherein, the one or more static images are viewed directly, or viewed through the one or more planar arrangements of focusing elements without being projected thereby,
wherein, the one or more synthetic optical images are spatially coordinated with the one or more static images in such a manner that when viewed simultaneously the one or more synthetic optical images are:

visually enhanced by the one or more static images due to their mutual spatial arrangement through: (a) forming one or more new images or icons with the one or more static images; and/or (b) amplifying apparent movement of the one or more synthetic optical images, wherein the one or more static images are in the form of a pattern selected from the group of line patterns, dot patterns, intricate webbing or guilloche patterns, or vignettes; or canceled or rendered visually undetectable by the one or more static images due to their mutual spatial arrangement, wherein the one or more static images are in the form of microscopic holes that extend completely through the thickness of the film structure.

14. A micro-optic film structure, which comprises:
(a) a polymer film material having opposing surfaces;
(b) a planar arrangement of image icons located on or within one surface of the polymer film material; and
(c) a planar arrangement of focusing elements located on an opposing surface of the polymer film material,
wherein, the planar arrangements are configured such that when the planar arrangement of image icons is viewed through the planar arrangement of focusing elements, one or more magnified synthetic optical images are projected; and
(d) one or more static images directly or indirectly superimposed upon or formed through one or more image icons and/or one or more focusing elements,
wherein, the one or more static images are viewed directly, or viewed through the planar arrangement of focusing elements without being projected thereby,
wherein, the one or more magnified synthetic optical images are spatially coordinated with the one or more static images in such a manner that when viewed simultaneously the one or more synthetic optical images are:
visually enhanced by the one or more static images due to their mutual spatial arrangement through: (a) forming one or more new images or icons with the one or more static images; and/or (b) amplifying apparent movement of the one or more synthetic optical images, wherein the one or more static images are in the form of a pattern selected from the group of line patterns, dot patterns, intricate webbing or guilloche patterns, or vignettes; or
canceled or rendered visually undetectable by the one or more static images due to their mutual spatial arrangement,
wherein, the one or more magnified synthetic optical images projected by the film structure show orthoparallactic movement as the film structure is tilted or viewed from different viewing angles.

15. The micro-optic film structure of claim 14, wherein the one or more image icons are optionally filled voids or recesses formed on or within the polymer film material, and wherein the one or more static images are printed icons.

16. A security document or label having opposing surfaces and comprising at least one micro-optic film structure partially embedded in and/or mounted on a surface of the security document or label, wherein the micro-optic film structure has one or more planar arrangements of focusing elements, the micro-optic film structure projecting one or more synthetic optical images through the one or more planar arrangements of focusing elements, and one or more static images, which are viewed through the one or more planar arrangements of focusing elements without being projected thereby, wherein the one or more synthetic optical images are spatially coordinated with the one or more static images in such a manner that when viewed simultaneously the one or more synthetic optical images are:
visually enhanced by the one or more static images due to their mutual spatial arrangement through: (a) forming a legible phrase; and/or (b) amplifying apparent movement of the one or more synthetic optical images, wherein the one or more static images are in the form of a pattern selected from the group of line patterns, dot patterns, intricate webbing or guilloche patterns, or vignettes; or
canceled or rendered visually undetectable by the one or more static images due to their mutual spatial arrangement, wherein the one or more static images are negative or reverse likenesses of the one or more synthetic optical images.

17. The security document or label of claim 16, wherein the at least one micro-optic film structure comprises:
(a) one or more polymer film materials;
(b) one or more planar arrangements of image icons located on or within a polymer film material; and
(c) one or more planar arrangements of focusing elements located on either a polymer film material or on a planar arrangement of image icons,
wherein, the planar arrangements are configured such that when a planar arrangement of image icons is viewed through a planar arrangement of focusing elements, one or more synthetic optical images are projected; and
(d) one or more static images directly or indirectly superimposed upon or formed through one or more image icons and/or one or more focusing elements,
wherein, the one or more static images are spatially coordinated with the one or more synthetic optical images,
wherein, when the static images are viewed with the one or more synthetic optical images projected by the film structure, the static images visually enhance or cancel the one or more projected images.

18. The security document or label of claim 17, wherein the at least one micro-optic film structure in the form of a security thread is partially embedded in the security document or label, wherein the one or more static images are printed on one or both surfaces of the security document or label in areas overlying the partially embedded security thread.

19. The security document or label of claim 17, wherein the one or more image icons of the at least one micro-optic film structure are optionally filled voids or recesses formed on or within the one or more polymer film materials.

20. The security document or label of claim 19, wherein the one or more image icons are filled voids or recesses formed on or within the one or more polymer film materials.

21. A security document or label having opposing surfaces and comprising at least one micro-optic film structure partially embedded in and/or mounted on a surface of the security document or label, wherein the micro-optic film structure comprises:
(a) one or more polymer film materials;
(b) one or more planar arrangements of image icons located on or within a polymer film material; and
(c) one or more planar arrangements of focusing elements located on either a polymer film material or on a planar arrangement of image icons,
wherein, the planar arrangements are configured such that when a planar arrangement of image icons is viewed through a planar arrangement of focusing elements, one or more synthetic optical images are projected; and (d) one or more static images directly or indirectly superimposed upon or formed through one or more image icons and/or one or more focusing elements, wherein, the one or more static images are viewed directly, or viewed through the one or more planar arrangements of focusing elements without being projected thereby, wherein the one or more synthetic optical images are spatially coordinated with the one or more static images in such a manner that when viewed simultaneously the one or more synthetic optical images are:

visually enhanced by the one or more static images due to their mutual spatial arrangement through: (a) forming one or more new images or icons with the one or more static images; and/or (b) amplifying apparent movement of the one or more synthetic optical images, wherein the one or more static images are in the form of a pattern selected from the group of line patterns, dot patterns, intricate webbing or guilloche patterns, or vignettes; or canceled or rendered visually undetectable by the one or more static images due to their mutual spatial arrangement, wherein the static images are in the form of microscopic holes extending through the film structure and overlying security document or label.

22. A micro-optic film structure having one or more planar arrangements of focusing elements, and one or more planar arrangements of image icons in the form of optionally filled voids or recesses, the planar arrangements configured such that when a planar arrangement of image icons is viewed through a planar arrangement of focusing elements one or more synthetic optical images are projected through the one or more planar arrangements of focusing elements, the micro-optic film structure also having one or more static images, which are viewed directly, or viewed through the one or more planar arrangements of focusing elements without being projected thereby, wherein the one or more synthetic optical images are spatially coordinated with the one or more static images in such a manner that when viewed simultaneously the one or more synthetic optical images are:

visually enhanced by the one or more static images due to their mutual spatial arrangement through: (a) forming one or more new images or icons with the one or more static images; and/or (b) amplifying apparent movement of the one or more synthetic optical images, wherein the one or more static images are in the form of a pattern selected from the group of line patterns, dot patterns, intricate webbing or guilloche patterns, or vignettes; or canceled or rendered visually undetectable by the one or more static images due to their mutual spatial arrangement.

23. The micro-optic film structure of claim 22, wherein the one or more planar arrangements of image icons are in the form of filled voids or recesses.

24. The micro-optic film structure of claim 22, wherein the one or more synthetic optical images are visually enhanced by the one or more static images due to their mutual spatial arrangement through forming one or more new images or icons with the one or more static images.

25. The micro-optic film structure of claim 22, wherein the one or more synthetic optical images are visually enhanced by the one or more static images due to their mutual spatial arrangement through amplifying apparent movement of the one or more synthetic optical images, wherein the one or more static images are in the form of a pattern selected from the group of line patterns, dot patterns, intricate webbing or guilloche patterns, or vignettes.

26. The micro-optic film structure of claim 22, wherein the one or more synthetic optical images are canceled or rendered visually undetectable by the one or more static images due to their mutual spatial arrangement.

27. A security document or label having opposing surfaces and comprising at least one micro-optic film structure partially embedded in and/or mounted on a surface of the security document or label, wherein the micro-optic film structure has one or more planar arrangements of focusing elements, and one or more planar arrangements of image icons in the form of optionally filled voids or recesses, the planar arrangements configured such that when a planar arrangement of image icons is viewed through a planar arrangement of focusing elements one or more synthetic optical images are projected through the one or more planar arrangements of focusing elements, the micro-optic film structure also having one or more static images, which are viewed directly, or viewed through the one or more planar arrangements of focusing elements without being projected thereby, wherein the one or more synthetic optical images are spatially coordinated with the one or more static images in such a manner that when viewed simultaneously the one or more synthetic optical images are:

visually enhanced by the one or more static images due to their mutual spatial arrangement through: (a) forming one or more new images or icons with the one or more static images; and/or (b) amplifying apparent movement of the one or more synthetic optical images, wherein the one or more static images are in the form of a pattern selected from the group of line patterns, dot patterns, intricate webbing or guilloche patterns, or vignettes; or canceled or rendered visually undetectable by the one or more static images due to their mutual spatial arrangement.

28. A method for authenticating the security document or label of claim 27, which method comprises:

(a) directing a coherent light source at a shallow angle over the planar arrangement of focusing elements of the micro-optic film structure to project a unique pattern;

(b) detecting the unique projected pattern; and (c) comparing the detected unique projected pattern to expected patterns.

29. The security document or label of claim 27, wherein the one or more planar arrangements of image icons of the micro-optic film structure are in the form of filled voids or recesses.

30. A micro-optic film structure having one or more planar arrangements of focusing elements, which projects one or more synthetic optical images through the one or more planar arrangements of focusing elements, and one or more static images, which are viewed through the one or more planar arrangements of focusing elements without being projected thereby, wherein the one or more synthetic optical images are spatially coordinated with the one or more static images in such a manner that the one or more synthetic optical images are visually enhanced or canceled by the one or more static images due to their mutual spatial arrangement through:
 (a) changing at least one of color, optical density, luminosity, or background of the one or more synthetic optical images;
 (b) amplifying apparent movement of the one or more synthetic optical images, wherein the one or more static images are in the form of a pattern selected from the group of line patterns, dot patterns, intricate webbing or guilloche patterns, or vignettes; and/or
 (c) forming a legible phrase.

31. The micro-optic film structure of claim 30, also having one or more planar arrangements of image icons, wherein the image icons are optionally filled voids or recesses formed on or within one or more polymer film materials.

32. The micro-optic film structure of claim 31, wherein the image icons are filled voids or recesses formed on or within one or more polymer film materials.

33. The micro-optic film structure of claim 30, wherein the one or more synthetic optical images are visually enhanced or canceled by the one or more static images due to their mutual spatial arrangement through changing at least one of color, optical density, luminosity, or background of the one or more synthetic optical images.

34. The micro-optic film structure of claim 30, wherein the one or more synthetic optical images are visually enhanced or canceled by the one or more static images due to their mutual spatial arrangement through amplifying apparent movement of the one or more synthetic optical images, wherein the one or more static images are in the form of a pattern selected from the group of line patterns, dot patterns, intricate webbing or guilloche patterns, or vignettes.

35. The micro-optic film structure of claim 30, wherein the one or more synthetic optical images are visually enhanced or canceled by the one or more static images due to their mutual spatial arrangement through forming a legible phrase.

* * * * *